United States Patent [19]

Bribach

[11] Patent Number: 5,422,875
[45] Date of Patent: Jun. 6, 1995

[54] COMPACT DISC SLIP LOCK CASE (AND BOOKLET)

[76] Inventor: Christopher J. Bribach, 1126 Folsom St., San Francisco, Calif. 94103

[21] Appl. No.: 62,801

[22] Filed: May 20, 1993

Related U.S. Application Data

[63] Continuation-in-part of Ser. No. 890,036, May 28, 1992, abandoned.

[51] Int. Cl.⁶ .................. G11B 23/03; B65D 85/57
[52] U.S. Cl. ..................... 369/291; 206/312; 206/311
[58] Field of Search ............... 369/291, 292; 360/133; 206/307, 309, 310, 311, 312, 313; 229/68 R, 72

[56] References Cited

U.S. PATENT DOCUMENTS

| | | | |
|---|---|---|---|
| 1,042,542 | 10/1912 | Foster | 229/68 R |
| 2,463,450 | 3/1949 | Wisner | 229/68 R |
| 3,774,757 | 11/1973 | Harris et al. | 206/313 |
| 3,826,360 | 7/1974 | Shore | 206/312 |
| 3,949,873 | 4/1976 | Platt | 206/311 |
| 4,620,630 | 11/1986 | Moss | 206/313 |
| 4,640,413 | 2/1987 | Kaplan et al. | 206/312 |
| 4,694,954 | 9/1987 | Moss | 206/312 |
| 4,694,957 | 9/1987 | Ackeret | 206/309 |
| 4,709,812 | 12/1987 | Kosterka | 206/310 |
| 4,850,731 | 7/1989 | Youngs | 206/311 |
| 4,964,510 | 10/1990 | Loyd | 206/312 |
| 5,048,681 | 9/1991 | Henkel | 206/312 |
| 5,085,318 | 2/1992 | Leverick | 206/312 |
| 5,086,923 | 2/1992 | King et al. | 206/313 |
| 5,088,599 | 2/1992 | Mahler | 206/313 |
| 5,096,064 | 3/1992 | Rufo, Sr. et al. | 369/291 |
| 5,101,973 | 4/1992 | Martinez | 206/312 |
| 5,154,284 | 10/1992 | Starkey | 206/313 |
| 5,188,229 | 2/1993 | Bernstein | 206/312 |
| 5,188,230 | 2/1993 | O'Brien | 206/312 |
| 5,207,717 | 5/1993 | Manning | 206/312 |

Primary Examiner—Stuart S. Levy
Assistant Examiner—Paul J. Ditmyer
Attorney, Agent, or Firm—Townsend and Townsend Khourie and Crew

[57] ABSTRACT

A compact disc retaining pocket is disclosed for holding and protecting a compact disc, having a round exterior edge, a central spindle hole, and recorded information on one side of the disc. This pocket includes rectilinear front and rear panels covering the disc, fastened together on three sides and having an open fourth side for receiving said compact disc between the panels to define a pocket for said compact disc. A peripheral boundary is formed by at least the three fastened sides, this peripheral boundary having a bottom lower surfaces opposite the fourth side for receiving the penetrating edge of the compact disc at two points opposite the open fourth side when said disc is inserted to said pocket. First and second locking protrusions are formed on either side of the peripheral boundary, these locking protrusions having a distance between the protrusions slightly less than the diameter of the compact disc and located slightly more than said radius of the compact disc from said bottom lower surface. This enables an inserted compact disc to be over center with respect to said protrusions and maintains the compact disc within said pocket adjacent the lower surface when said disc has said round edge registered to said lower surface.

2 Claims, 4 Drawing Sheets

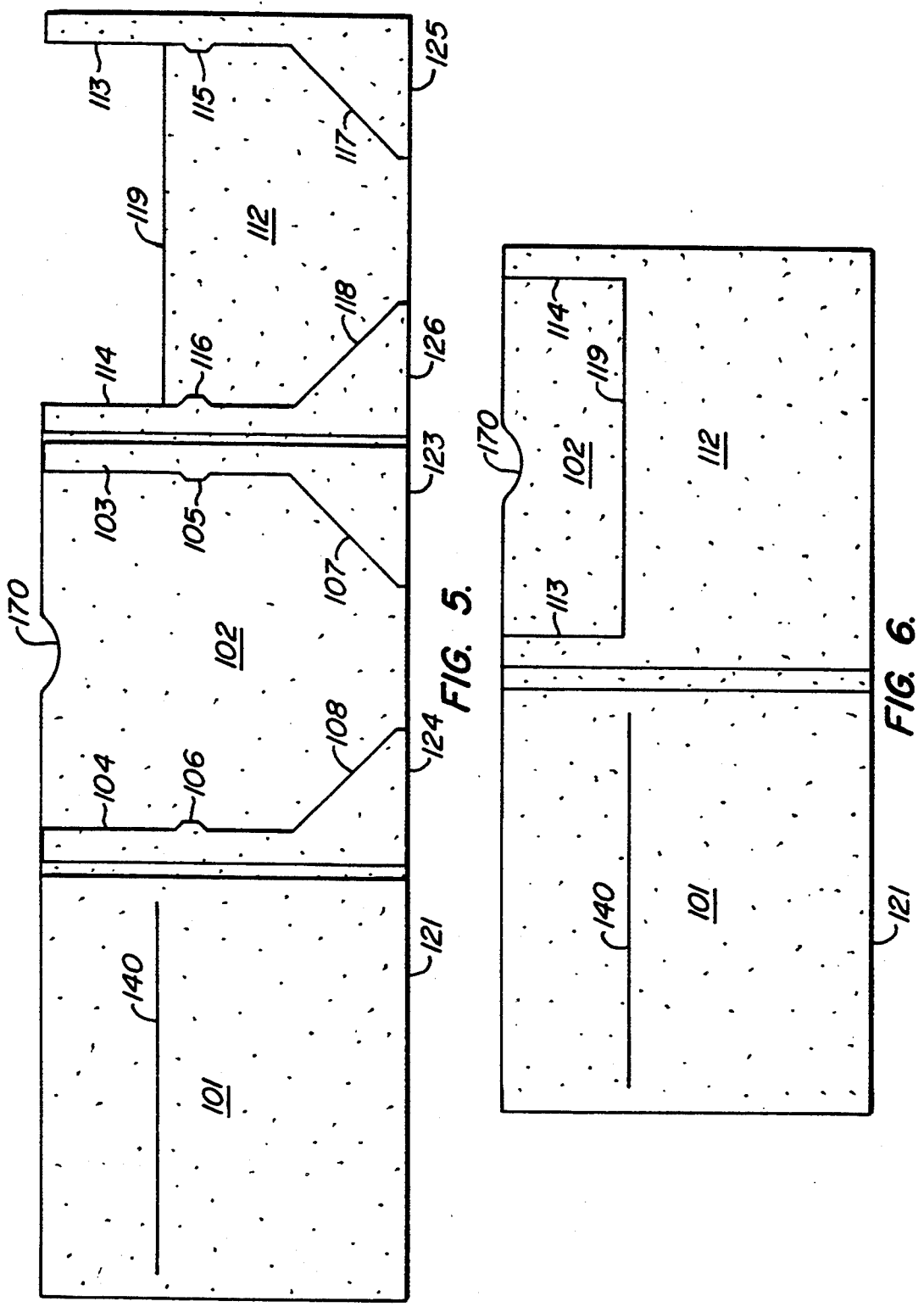

COMPACT DISC SLIP LOCK CASE (AND BOOKLET)

This application is a Continuation-in-Part of application Ser. No. 07/890,036, filed May 28, 1992, now abandoned.

BACKGROUND-FIELD OF INVENTION

This invention relates to presentable disk storage sleeves, specifically the presentation and storage of optical information compact discs.

BACKGROUND-DESCRIPTION OF PRIOR ART

Compact Discs generally are supplied to consumers in some kind of storage case to protect the transparent plastic optical layer from scratches. This case allows for easy stocking, transportation, display, and home storage and use.

Currently the industry standard provides CDs in plastic cases, called Jewel Cases (patent pending), that are made with environmentally harmful petroleum products and easily become scratched and unattractive. The Jewel Case not only makes it difficult to manage the product with large open hand maneuvers, but ceases to clasp the CD through use because the plastic prongs eventually break off. If the Jewel Case is ever dropped, the plastic hinge cover too easily breaks off, leaving the case incredibly inconvenient. During shipping, the CDs often encounter heat. The actual CDs are not damaged by adverse temperatures, however the CD gripping clasp of the Jewel Case shrinks to become useless so the CD easily scratches. Manufacturing costs of the Jewel Case not only include the plastic case itself but color paper printing process of an Inlay Card and CD booklet that must be inserted into the case. The Jewel Case is inconvenient, costly and wasteful.

A new addition to CD packaging and handling is the Digipak produced under license from ASI Inc. by James Upton 021-692-1171 England. This eliminates much of the plastic of the Jewel Case; however the environmentally harmful plastic insert piece uses a plastic clasp that shrinks in heat and breaks with use. Also the small indents around the edges of the compact disc make it hard to grasp using the some open hand method of the Jewel Case.

Several versions of envelope and sleeve type enclosures have received patents: U.S. Pat. No. 5,048,681 to Walter R. Henkel on Jul. 9, 1990; U.S. Pat. No. 4,850,731 to Ross O. Youngs on May 6, 1988; and U.S. Pat. No. 4,620,630 to Ira L. Moss on Oct. 18, 1985, each of which involve a simple folded over paper means to enclose the CD. The problem with these solutions is that their spine is too small to accommodate the industry standard for filing CDs (like books) in shelves for easy access. Also their size is too small for industry standard displays except for Ira Moss's solution which is too large and inconvenient for daily consumer use.

The patent issued to Steven Maler on Jun. 29, 1990 (U.S. Pat. No. 5,088,599) comes closer to the necessary thickness needed to achieve a legible spine and provides a locking mechanism to retain the CD; however his solution does not achieve the industry standard dimensions because his retaining devices must use the edge of his package. Also Maler's solution involves a complicated manufacturing process of many layers of folded retaining pieces which adds to costs. Also the gripping mechanism of his package applies pressure to the optical surface of the compact disc, increasing the risk of disc damage.

SUMMARY OF THE INVENTION

A compact disc retaining pocket is disclosed for holding and protecting a compact disc, having a round exterior edge, a central spindle hole, and recorded information on one side of the disc. This pocket includes rectilinear front and rear panels covering the disc, fastened together on three sides and having an open fourth side for receiving said compact disc between the panels to define a pocket for said compact disc. A peripheral boundary is formed by at least the three fastened sides, this peripheral boundary having a bottom lower surfaces opposite the fourth side for receiving the penetrating edge of the compact disc at two points opposite the open fourth side when said disc is inserted to said pocket. First and second locking protrusions are formed on either side of the peripheral boundary, these locking protrusions having a distance between the protrusions slightly less than the diameter of the compact disc and located slightly more than said radius of the compact disc from said bottom lower surface. This enables an inserted compact disc to be over center with respect to said protrusions and maintains the compact disc within said pocket adjacent the lower surface when said disc has said round edge registered to said lower surface.

OBJECTS AND ADVANTAGES

Accordingly, besides the objects and advantages of the compact disc storage sleeves described in my above patent, several objects and advantages of the present invention are:

(a) to provide a CD storage sleeve that is environmentally biodegradable and derived from natural replenishable resources;

(b) to provide a CD storage sleeve which can conform to current industry standard sizes and displays;

(c) to provide a CD storage sleeve that has a legible spine for easy reference on bookshelf type storage along side other industry standard packages;

(d) to provide a CD storage sleeve that can be cheaply manufactured using a minimal number of parts with a minimal number of cuts and folds and printed pieces;

(e) to provide a CD storage sleeve which can have an attractive appearance with only one small-sized color process part;

(f) to provide a CD storage sleeve that will continue to retain the product securely after much repetitive use;

(g) to provide a CD storage sleeve that does not scratch or damage the compact disc's optical surface.

Further objects and advantages are to provide a compact disc storage sleeve which can be used easily and convenient to store, display, and use compact discs, without damage to the compact disc; which is simple to use and inexpensive to manufacture; which will remain a collectable item through age, which can feel good in a consumer's hands as well as be a pleasing experience to discover the entirety of the product.

DRAWING FIGURES

In the drawings, closely related figures have the some number but different alphabetic suffixes.

FIG. 5 shows the paper cut out with the arms containing over center protrusions having been folded upwardly with respect to the pocket sides;

FIG. 6 shows the assembled jacket with the two covers in the folded open position; and, FIG. 7 is a view similar to FIG. 5 showing the relationship of compact disc to the disc retaining protrusions utilized with this invention.

LIST OF REFERENCE NUMERALS

Figure 1:
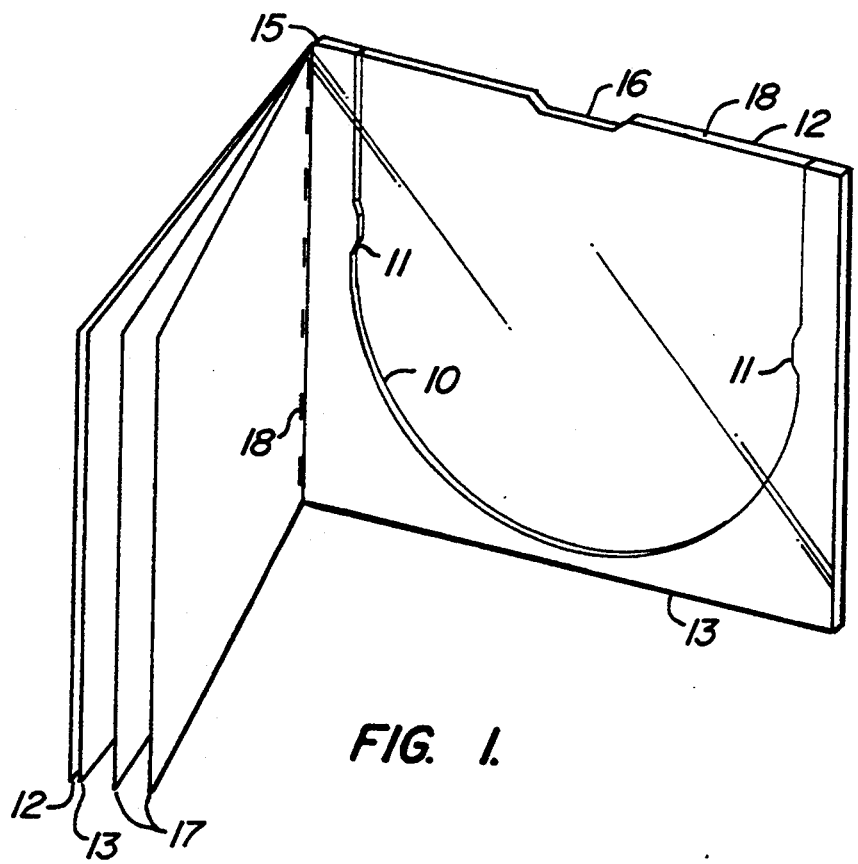
FIG. 1 shows the opened CD case and booklet with visible CD locking piece and booklet with multiple pages, this figure also implying how the CD case would appear without the booklet attached.
Figure 2:
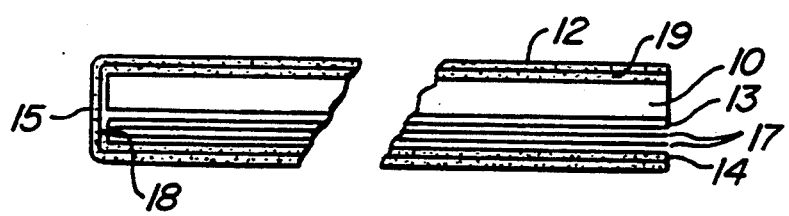
FIG. 2 shows a close-up top view of the CD case and booklet which shows how the binding and adhesive holds the parts together it being noted that the CD locking piece is solid shaded.

Reference Numerals in Drawings 1, 2 and 3:
10 CD locking piece
11 Locking Bump
12 Exterior Sleeve
13 Interior Sleeve
14 Binding Adhesive
15 Printed Spine
16 CD Grip Notch
17 Multiple Booklet Pages
18 Staple Binding
19 Unwoven Material

DESCRIPTION-FIGS. 1-3

A typical embodiment of the CD locking case and booklet is illustrated in FIG. 1 in isometric.

The most distinctive functional piece is the CD locking piece 10 which actually snaps the compact disc into a locking position keeping it from falling out during shipping and handling. This CD locking piece may be die-cut from a chip-board stock that is a little thicker than an actual compact disc thickness. Other plastic materials could be molded into this similar shape but chip-board is formed from 100% recycled paper products, maintaining an environmentally safe product.

The CD locking piece 10 could have metal insert clips which snap the compact disc into place or a plastic formed piece could support plastic spring clips that retain the compact disc into place.

Glue Laminated to the CD locking piece 10 could be a non-woven fiber 19 soft-plastic piece that reduces the scratching of the compact disc.

To secure the compact disc within the CD locking piece 10, an exterior sleeve 12 and interior sleeve 13 are glue laminated on each side of the CD locking piece, then laminated back to back to create a booklet cover.

Optional multiple booklet pages 17 may be bound by staples 18 or stitching or glue on the inside of the interior sleeve 13.

The exterior sleeve 12 can be the only color process printed surface and the package maintains a quality presentation. The interior sleeve 13 may be colored as well as the multiple pages 17.

Figure 3:
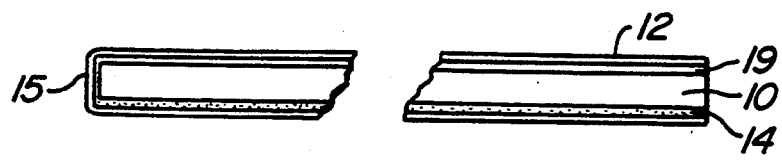
FIG. 3 shows a close-up top view of the CD case without the booklet which shows how the binding and adhesive holds the parts together, it being noted that this CD locking piece is solid shaded.

FIG. 3 shows how the CD locking case may be constructed without a booklet to cut costs. In this case, only the exterior sleeve 12 would be used and act as the complete retainer for the compact disc.

A CD grip notch 16 should be made in the interior and exterior sleeves 12 & 13 so that the compact disc con be easily pinched at its edge to remove it from the CD locking piece 10.

The CD locking piece 10 could also be formed from two pieces of thinner stock laminated together that are glue laminated to the interior and exterior sleeves 12 & 13. This way the whole CD locking case and booklet could be manufactured from one piece of medium weight stock.

The whole CD locking case could be molded from one piece of plastic or two interlocking pieces of plastic or utilize metal or plastic clips which act as my proposed locking bumps 11.

OPERATION

The CD locking case once manufactured would be stored, sorted, distributed, stocked, displayed, and sold, like all existing industry standard CD cases.

The use of the case would involve the opening of the booklet cover to reveal the booklet pages and the CD grip notch 16 which would allow easy access to pinch the compact disc to pull it from the grip of the CD locking piece 10. The compact disc could be slid out and placed in a compact disc player. The CD grip notch 16 maintains the gripping area on the CD to be at the edge where no optical information exists, therefore eliminating the risk of data damage.

The compact disc could easily be returned to the CD locking case and snapped into place to secure it from harm and filed on a bookshelf so that the easily readable spine 15 could be referenced as needed.

Although the description above contains many specificities, these should not be construed as limiting the scope of the invention but as merely providing illustrations of some of the presently preferred embodiments of this invention. For example, the CD locking case can have other shapes, such as circular, oval, trapezoidal, triangular, etc.; the actual CD locking piece could be constructed of multi-layers or pieces folded and attached to the interior and exterior sleeves; the CD locking case can have a booklet attached with any combination of printed or non-printed pieces or even no booklet at all or a booklet that could be attached at a later manufacturing date, etc.

Figure 4:
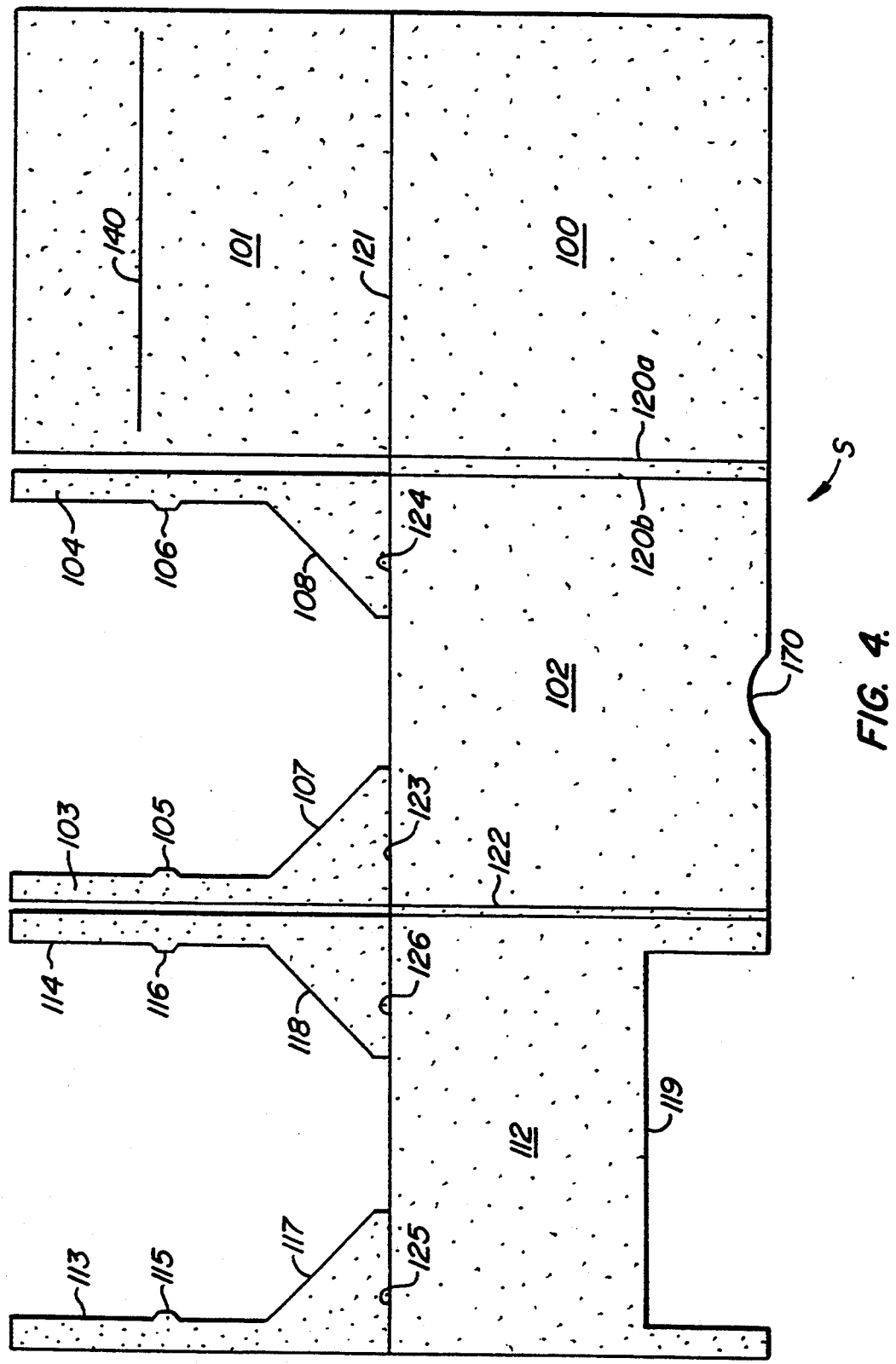
FIG. 4 shows a paper cut out ready to be formed into a folded paper jacket for containing a compact disc.
Figure 7:
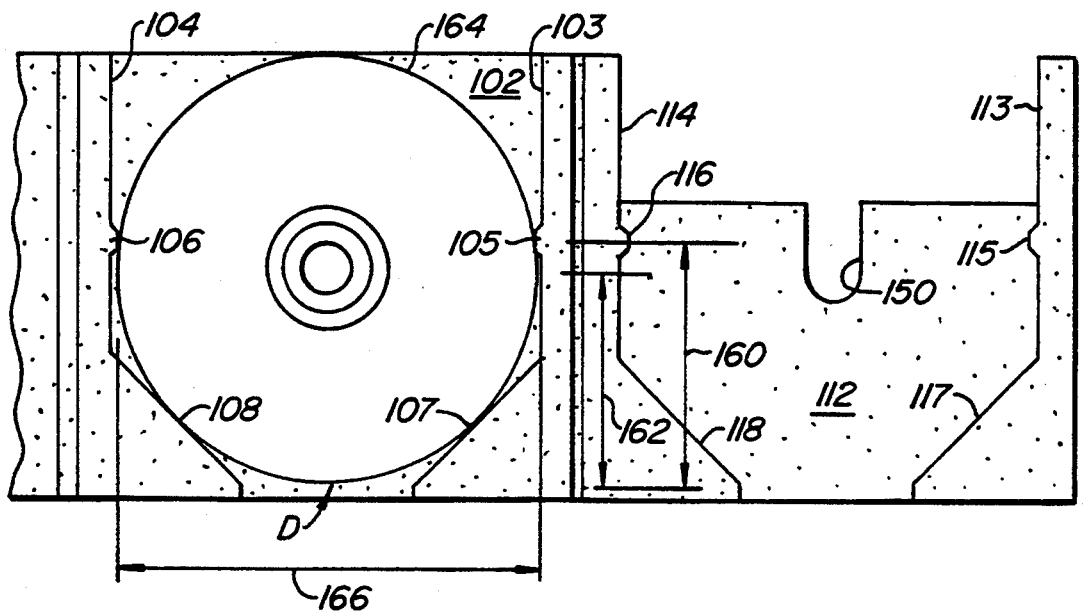

With respect to FIGS. 4-7, the reader will understand that this invention can be fabricated from folded cardboard stock. Specifically, FIGS. 4-6 illustrate the folding of the stock to form the record jacket of this invention and FIG. 7 illustrates the relationship of the partially folded stock to a compact disc so that the locking of the disc to the jacket can be understood.

Referring to FIG. 4, a single cardboard sheet S is shown before folding into the disc retaining jacket of this invention. The jacket includes panels 100, 102 and 112 which are joined by folds. These folds are fold 121 between panels 100 and 101, folds 120A and 120B between panels 100 and 102, and folds 122 between panels 102 and 112.

A word about folds 120A and 120B. Specifically, and as will be apparent with respect to FIG. 6, folds 120A and 120B are separated by a spatial interval. In such separation, they define on the back spine of the jacket a flat area at 90° to the major outside surfaces of panels 101, 102. It is to this area that information can be given about the jacket contents. This information will be displayed when the jackets are placed with the major surfaces side-by-side.

Panels 102 and 112 have arms folded from the panel sides. Co-axial folds 123 and 124 fasten arms 103 and 104 respectively to panel 102. Arm 103 hinged to panel 102 includes over center protrusion 105 and lower bearing surface 107. Similarly, arm 104 hinged to panel 102 includes over center protrusion 106 and lower bearing surface 108. As will hereafter be explained, protrusions 105, 106 cooperate in over center engagement to a compact disc to maintain the disc within the jacket. At the same time, the lower bearing surfaces 107, 108 provide the surface against which the edge of the compact disc rests when stored in over center relationship to protrusions 105, 106.

Panel 112 includes arms 113, 114 identical to arms 103, 104. Specifically, arm 113 is hinged to panel 112 at fold 125. Likewise, arm 114 is hinged to panel 112 at fold 126. Arm 113 includes over center protrusions 115 and bearing surface 117. Similarity, arm 114 includes over center protrusion 116 and bearing surface 118. Panel 112 also includes an indented edge 119. As will be seen, the purpose of this indented edge will be to expose typically the unrecorded side of the compact disc so that it may be conveniently grasped.

Referring to FIG. 5, panel 101 has been folded onto panel 100. Likewise, arms 103, 104 have been folded onto panel 102 with arms 113, 114 being folded onto panel 112. In each case, fastening of the folded members will have to occur. For example, panel 101 is provided with a slot 140 so as to define a pamphlet receiving interval between the two panels 100, 101. Arms 103, 104, 113, 114 are fastened so as to be integral with the construction.

Referring to FIG. 6, the jacket is shown with panels 102 and 112 folded one onto another. Fastening of the panels has occurred and the jacket is completely assembled. It will be noted that in such fastening protrusion 105 and 116 are superimposed one upon another; likewise, protrusions 106 and 115 are superimposed one upon another.

There remains to be understood the effect of these protrusions in retaining a compact disc D within the jacket. This can best be understood with reference to FIG. 7.

Referring to FIG. 7, panel 102 is shown with compact disc D placed within the panel before closing of the panel. This view shows protrusions 105, 106 of arms 103, 104 interacting with round edge 164 of disc D. Two things need to be understood in understanding the relationship between edge 164 of disc D and protrusions 105, 106.

First, protrusions 105, 106 are slightly closer together that the diameter 166 of disc D. Secondly, protrusions 105, 106 are "over center" with respect to disc D.

Regarding this over center relationship, it can be seen that the penetration of disc D into the pocket between panels 102, 112 is limited by surfaces 107, 108 (and surfaces 117 and 118 when the panels 102, 112 are juxtaposed). At the same time, protrusions 105, 106, 115, and 116 are more than one disc radius 162 away from the full penetration of disc D into the pocket formed by panels 102, 112. Further, the combined thickness of arms 103, 114 one pocket side and arms 113, 104 on the other pocket side slightly exceeds the thickness of the compact disc D. This leads to the "snap fit" or over center fit of this invention.

Regarding this over center fit, disc D at round edge 164 pushed past protrusions 105, 116 on one side and protrusions 106, 115 on the other side. Once past these protrusions, disc D will be captured within the pocket.

Referring to FIG. 7, it will be seen that panel 112 is cut away with U-shaped slot 150. This is a particularly advantageous aspect of my invention. Specifically, U-shaped slot exposes central spindle hole 168 of disc D. By the expedient of having a digit penetrate spindle hole 168 and bear against panel 102, the pocket sides are separated at panels 102, 112. At the same time, another digit—preferably of the same hand—can grasp disc D at edge 164 overlying a groove 170 in panel 102 (See FIGS. 4 and 5). This enables the disc D to be moved clear of the pocket with digit contact only at the center and edge of disc D—a movement that assures that the sound recorded surface of disc D is untouched.

Thus the scope of the invention should be determined by the appended claims and their legal equivalents, rather than by the examples given.

What is claimed is:

1. A folded paper jacket for holding and protecting the sound surface of a compact disc with a round edge of a given diameter having digitally recorded information recorded on at least one side of said round compact disc, said package comprising:

a compact disc retaining pocket, said pocket including;

a front and rear rectilinear panels fastened one to another at a first folded hinge;

said front and rear rectilinear panels confronted one to another for receiving said compact disc between said panels to define said pocket for said compact disc to retain said disc in said jacket;

first and second arms folded to at least one of said panels at opposite sides thereof, said first and second folded arms defining locking protrusions interiorly of said pocket on opposite sides of said pocket, said locking protrusions having a distance between said protrusions slightly less than the diameter of said compact disc and located slightly more than a radius of said compact disc from said bottom lower surface of said pocket so as to be over center with respect to said lower surface for maintaining said compact disc within said pocket adjacent said lower surface when said disc has said round edge registered to said lower surface;

third and fourth arms folded to said other of said panels at opposite sides thereof, said third and forth folded arms defining locking protrusions interiorly of said pocket on opposite sides of said pocket, said locking protrusions registered to the locking protrusions of said first and second arms; and, means for fastening said front and rear panels together with said arms therebetween at three sides and having an open fourth side to define and entrance to said pocket for receiving said disc.

2. The invention of claim 1 and including:

a peripheral boundary between said panels, said peripheral boundary having a bottom lower surface opposite said open fourth side for receiving the penetrating edge of said compact disc on at least two portions thereof opposite said open fourth side when said disc is inserted to said pocket.

* * * * *